Nov. 13, 1945.  W. NOBLE  2,388,863
WORM GEAR REDUCTION UNIT
Filed June 12, 1943  2 Sheets-Sheet 1

INVENTOR.
WARREN NOBLE
BY
Oberlin, Limbach & Day.
ATTORNEYS

Nov. 13, 1945.    W. NOBLE    2,388,863
WORM GEAR REDUCTION UNIT
Filed June 12, 1943    2 Sheets-Sheet 2
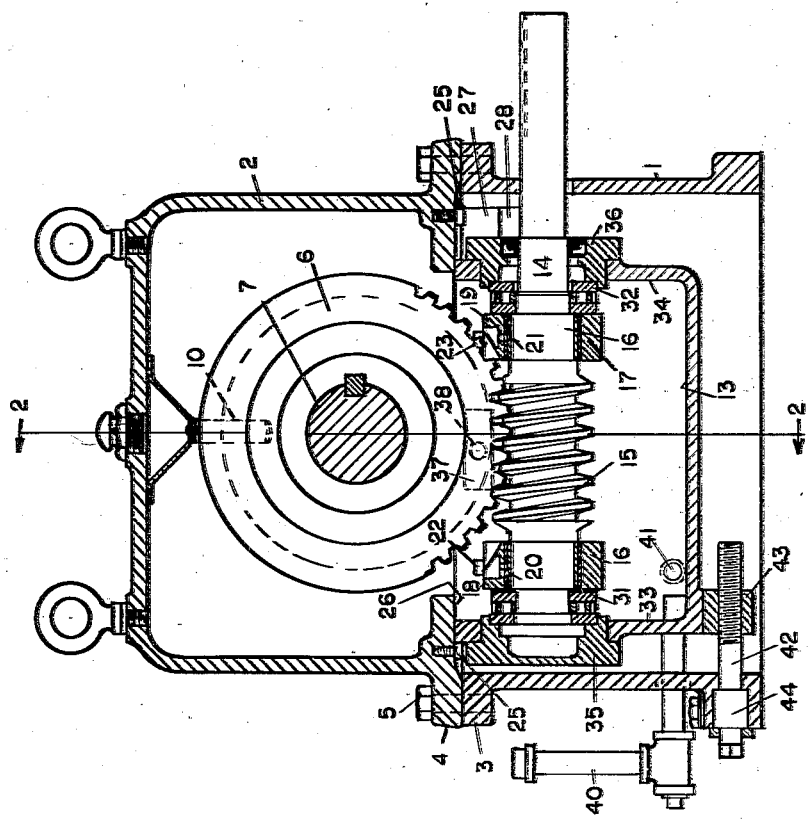
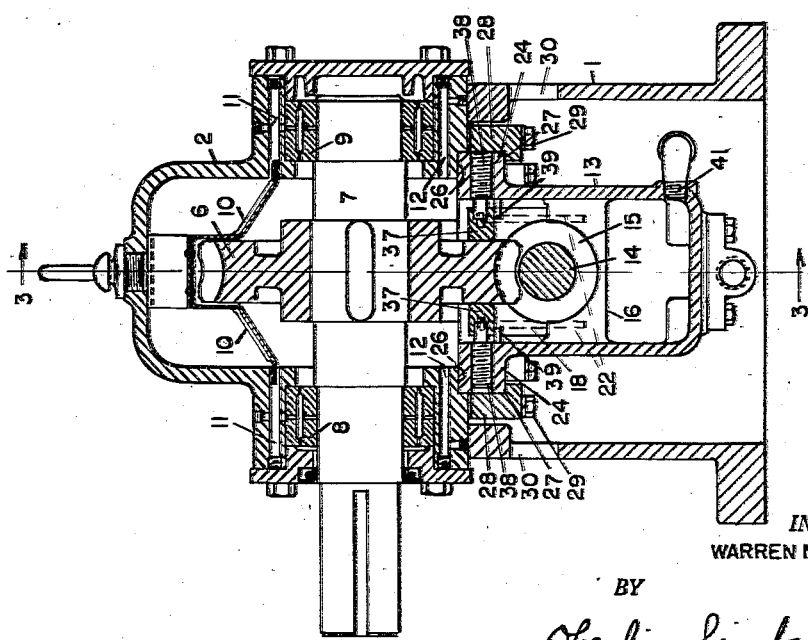
INVENTOR.
WARREN NOBLE
BY
ATTORNEYS Patented Nov. 13, 1945

2,388,863

UNITED STATES PATENT OFFICE 2,388,863

WORM GEAR REDUCTION UNIT

Warren Noble, Cleveland, Ohio, assignor to The Cleveland Worm & Gear Company, Cleveland, Ohio, a corporation of Ohio Application June 12, 1943, Serial No. 490,602

11 Claims. (Cl. 74—425)

The present invention relates to a reduction gear unit of the worm and worm wheel type. As a worm rotates in mesh with the teeth of a conjugate wheel, there are created essentially three different forces or reactions between the worm and wheel, namely: (1) longitudinal, axial thrust on the worm, which represents the tendency of the worm to "unscrew" itself from the teeth of the wheel if the latter were locked against rotation; (2) lateral, radial side thrust on the worm, which is represented by the tendency of the worm to be displaced in a direction transverse to its axis and away from the axis of the worm wheel, which is a function of the pressure angle of the meshing teeth, and; (3) side thrust on the worm wheel which is created by the rubbing action of the worm threads across the faces of the wheel teeth, resulting in a force tending to displace the worm wheel in the direction of its axis, which force is normally concentrated at the axis or hub of the worm wheel.

The general object and nature of my invention, therefore, is to provide a worm gear reduction unit construction wherein the three above-named generated forces are accommodated and compensated for in a novel and efficient manner, thus contributing to increased operating efficiency and life of the reduction unit as a whole. Briefly stated, this objective is accomplished according to the principle of my invention, by providing a single mounting member for the worm wherein all of these enumerated stresses are concentrated without transmission to possible weaker points or parts of the gear reduction unit. This permits the single worm mounting member to be fabricated from a material (such as forged steel) having greater inherent strength than the material (such as cast iron or aluminum) of the housing parts to which such stresses have heretofore been applied.

My invention also provides means for longitudinally adjusting and setting the worm with respect to the wheel which can be made without disturbing or changing the main supporting housing or frame of the unit. Worms are frequently made with a false lead for the purpose of taking up backlash. This requires a longitudinal adjustment of the worm; which is rendered quite conveniently possible by my invention. Furthermore, as some portions of the thread of the worm have a greater degree of contact with the wheel teeth during normal operation, longitudinal adjustment of the worm with respect to the center line of the gear renders it possible to bring new and unworn portions of the worm threads in contact with the wheel teeth, thus imparting additional life and usefulness to the worm and worm wheel elements.

The housing of worm gear reduction units have their bearing supports for the worm and worm wheel located on fixed center lines. Heretofore, it has been necessary to so manufacture the worm and worm wheel sets to be assembled with such housings that the normal center lines of the worm and wheel coincide as closely as possible with the fixed centers of the bearings in the housing. In other words, it has previously been necessary to perform additional relatively expensive machining operations upon the worm and gear sets in order to match them individually with the housing in which they are to be mounted.

According to the principle of my invention, the provision of the separate supporting member for the worm permits an adjustment of the center line distances of the worm and wheel upon assembly in the housing, thus rendering it possible to, in effect, match the housing to the worm and worm wheel elements, eliminating such additional machining work heretofore required on the latter.

My invention also possesses the additional object and advantage of providing for an initial side center setting of the worm wheel with respect to the worm, which setting can be made in the first instance by the manufacturer of the worm and wheel gear elements. This initial side center setting of the gear elements can, by reason of my invention, be maintained in the assembly of the gear elements in the housing, without special changes or modifications in the latter.

Additional objects and advantages of my invention shall become apparent as the following description proceeds.

To the accomplishment of the foregoing and related ends, said invention then comprises the features hereinafter fully described and particularly pointed out in the claims, the following description and the annexed drawings setting forth in detail certain illustrative embodiments of the invention, these being indicative, however, of but a few of the various ways in which the principle of the invention may be employed.

In said annexed drawings:

Fig. 2 is a vertical, sectional view taken substantially along line 2—2 of Fig. 1;

Fig. 3 is a vertical, sectional view taken along a plane normal to that of Fig. 2 and substantially along line 3—3 of Fig. 2.

Figure 1:
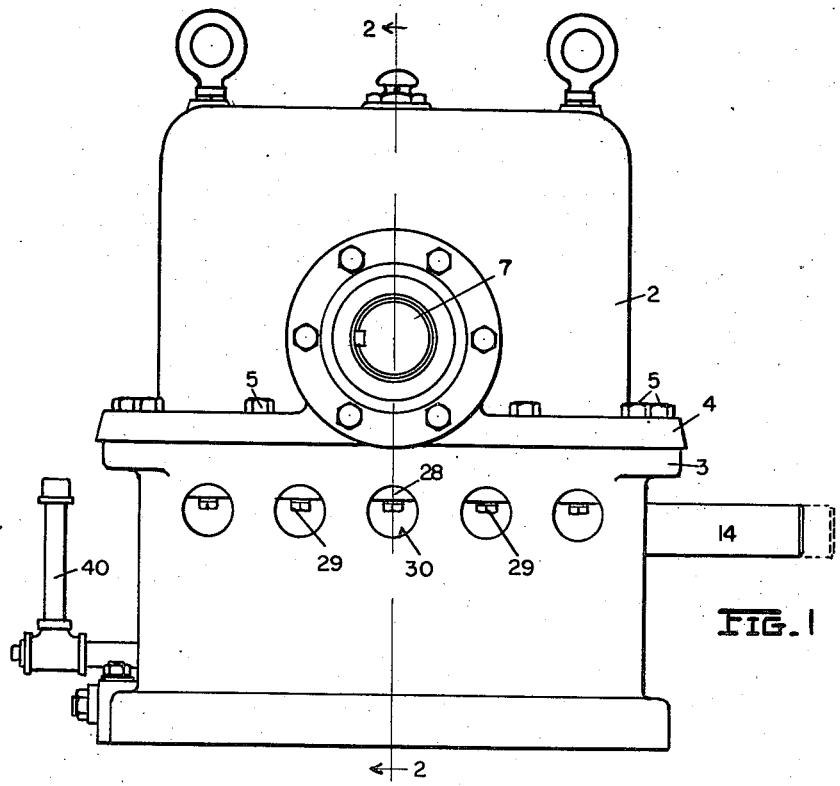
Fig. 1 is a side elevational view of a worm gear reduction unit.

Now referring more particularly to the drawings, the device shown therein comprises an outer, or main supporting housing consisting of the lower base housing portion 1, and the upper, enclosing housing portion 2. The upper and lower housing parts 1 and 2 have the meeting flanges 3 and 4 which are suitably fastened together by means of the cap screws 5. The upper housing part 2 encloses the worm wheel 6 and its shaft 7 which is in turn journaled in the bearings 8 and 9. Oil scoops 10 are provided for picking up oil from the rim of the wheel 6 and conveying it to the drilled passages 11 leading to the bearings 8 and 9. Drain passages 12 are provided beneath the bearings 8 and 9 for permitting oil therefrom to drain back down into the main bath or reservoir of oil which is contained in the inner housing 13.

The inner housing 13 is made separate from the outer housing parts 1 and 2 and forms the individual mounting and stress receiving element for the worm shaft 14 and worm 15. In the particular form of construction illustrated in the attached drawings, this separate worm and shaft supporting member are combined with the oil reservoir. It will be equally apparent to those skilled in the art, however, that the oil reservoir portion may, or may not, be combined with the worm shaft mounting member, without transcending the scope of my invention.

The inner housing or support member 13 has the integral bearing struts 16 and 17 which are located immediately adjacent each end of the worm 15. Bearing caps 18 and 19 are assembled over the tops of the struts 16 and 17, respectively, being attached thereto by means of the cap screws 22 and 23. Suitable anti-friction bearings such as the needle bearings 20 and 21 are assembled within the bearing support elements 16, 17, 18 and 19.

The bearings 20 and 21 are located as closely as possible to the terminal ends of the worm 15, thus reducing the unsupported extent of the latter on its shaft 14 to a minimum. Heretofore, it has been customary to mount the worm shaft supporting bearings in a worm gear reduction unit in the outer housing walls, or immediately contiguous thereto. The force generated during operation of the worm and the wheel, tending to separate these two elements, would normally be resolved into a bending stress directed transversely to the axis of the worm shaft. The greater the span between the points of support of the worm shaft, the greater such bending force becomes. Accordingly, my above-described construction reduces this unsupported span to a minimum and, correspondingly, the bending force exerted upon the worm shaft 14. The inner housing 13 has laterally projecting, top flanges 24, which extend parallel to the worm shaft and are adapted to be received in slideways formed at the juncture of the upper and lower housing parts 1 and 2. Stop pins 25 are located adjacent each end of these slideways for the purpose of limiting the extent of longitudinal movement of the flanges 24 therein. Such slideways comprise the shoulder 26 in the bottom side of the upper housing part 2 and the opposed shoulders 27 formed on the blocks 28 which are bolted to the underside of the upper housing parts 2 by means of the cap screws 29.

Suitable openings 30 are provided in the lower housing portion wall 1, for the purpose of access to the screws 29.

Thrust bearings 31 and 32 are mounted on the worm shaft 14 between the radial support bearings 20 and the end walls 33 and 34 of the inner housing 13. The bearings 31 and 32 are assembled in the walls 33 and 34, respectively, by means of the mounting bushings 35 and 36.

Side thrust blocks 37 are adapted to slidably contact with the peripheral side faces or flat rim sides of the worm wheel 6. The thrust blocks 37 are mounted upon the set screws 38 which threadably engage in the flanges 24 of the inner housing 13. Dowel pins 39 are located underneath the thrust blocks 37 for maintaining the latter in desired alignment.

A combined filler and drain pipe 40 extends through the wall of the lower housing part 1 and is connected, as indicated at 41, to the oil reservoir portion of the inner housing 13.

An adjusting screw 42 threadably engages with the downwardly depending lug 43 on the bottom of the housing 13. The adjusting screw 42 has an enlarged diameter portion which is held against longitudinal movement in the bottom flange of the lower housing part 1. By application of a wrench to the projecting end of the screw 42, the adjustable longitudinal setting of the inner housing 13, together with the worm 15 and shaft 14, is accomplished. Thus, the longitudinal adjustment of the worm 15 with respect to the worm wheel 6, whether for the purpose of accommodating backlash take-up in a worm having a false lead, or for changing the longitudinal setting to compensate for worm thread wear, is simply and accurately effected by turning the screw 42, and then tightening the screws 29 to hold and lock the inner housing 13 in the desired position of setting.

Figure 4:
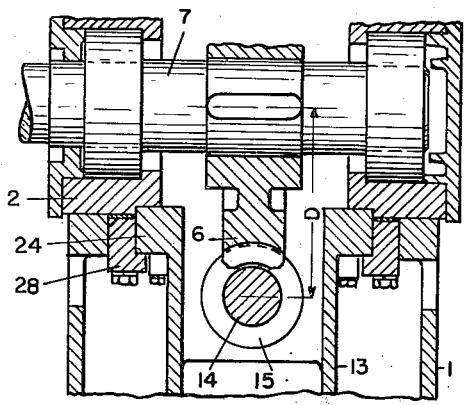
Figs. 4 and 5 are enlarged, sectional details, somewhat simplified, of a portion of Fig. 2 and illustrating the manner in which the device of my invention accommodates center line adjustment of the worm and worm wheel in the housing.
Figure 5:
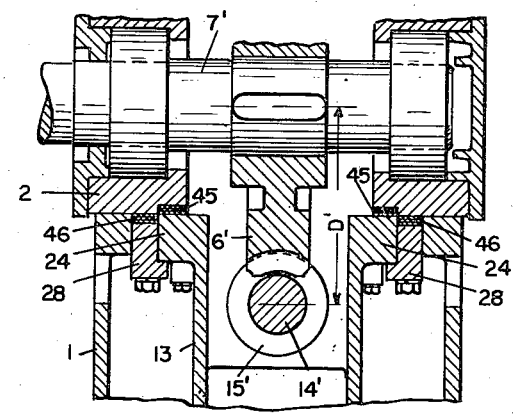

The manner in which my invention renders possible the adjustment of the center line distance between the worm 15 and worm wheel 6 is illustrated in Figs. 4 and 5. Thus, in Fig. 4 the worm 15 and worm wheel 6 have the center line distance D which is the same as the distance between the fixed centers upon which the bearings for the worm shaft 14 and worm wheel shaft 7 are located in the housing unit.

On the other hand, in Fig. 5, the worm 15' and worm wheel 6' are so originally made that they have a slightly greater center line distance D' than in the case of the worm and wheel of Fig. 4. In order to properly assemble the worm 15' and wheel 6' in a housing, it would be necessary either to so machine or remachine them to reduce the center line distance to the value D; or to change the location of the bearing mountings in the supporting housing. However, such expedients are not necessary by reason of my invention. Thus, the greater center line distance D' of the worm 15' and wheel 6' is simply accommodated by the introduction of the shims 45 and 46 between the flanges 24, slideway blocks 28 and the opposed bottom surfaces of the upper housing portion 2. The shims 45 and 46 are of a thickness corresponding to the difference between the distances D and D'.

From the foregoing description, it will readily be concluded that the device of my invention accomplishes all of the objectives and possesses all of the advantages hereinabove first recited. In addition, my invention has the advantage of enabling the replacement of a worn out worm and worm wheel gear set with a new gear set in the original housing, particularly where the new gear set has different center line settings than the original one. Thus, the user of the worm gear reduction unit is not faced with the necessity of discarding the entire unit when the worm and wheel have reached the end of their useful life, but he may still retain the housing and other unworn parts and thereby renew his original unit by simply replacing the worm and worm wheel gear set. This benefit to the user is rendered possible because, as above pointed out, my invention provides the several adjustments for matching the housing to the gears, rather than the converse.

Other modes of applying the principle of the invention may be employed, change being made as regards the details described, provided the features stated in any of the following claims or the equivalent of such be employed.

I therefore particularly point out and distinctly claim as my invention:

1. A worm gear mounting adapted to be assembled in an outer supporting housing, consisting of a separate supporting frame member having bearings for the worm shaft located immediately adjacent each end of the worm threads, and bearing blocks in said frame member adapted to bear against the peripheral side faces of the worm wheel.

2. A worm gear mounting adapted to be assembled in an outer supporting housing, consisting of a separate supporting frame member surrounding the worm, bearings in said frame member for the worm shaft, said bearings being located within the extremities of said frame member, and bearing blocks in said frame member adapted to bear against the peripheral side faces of the worm wheel.

3. In a worm gear reduction unit, an outer supporting housing, an inner supporting member having bearings for the worm shaft located immediately adjacent each end of the worm threads, bearing blocks in said inner supporting member adapted to bear against the peripheral side faces of the worm wheel, said inner supporting member being separate from said outer housing, means for mounting said inner supporting member in said outer housing, and means for adjusting said inner supporting member longitudinally of the worm shaft axis.

4. In a worm gear reduction unit, a double walled casing, comprising an outer wall to support the worm wheel and its shaft, a depending inner wall attached at its top to said outer wall, said inner wall having bearing means to support the worm and its shaft and means to contain lubricant, a slideway parallel to the worm shaft between said outer wall and the top of said inner wall for movably supporting the latter, and adjustable connecting means between said inner and said outer walls for holding said inner wall in a predetermined position in said slideway.

5. In a worm gear reduction unit, a two-part housing containing the worm, worm wheel and their respective shafts, and a separate mounting member carrying the worm and its shaft, said mounting member being attached to said housing substantially at the dividing line of the parts of the latter.

6. In a worm gear reduction unit, a two-part housing containing the worm, worm wheel and their respective shafts, and a separate mounting member, radial and axial thrust bearings in said mounting member carrying the worm shaft, and slide bearing blocks positioned in said mounting member and adapted to contact the peripheral sides of the worm wheel, said mounting member being attached to said housing substantially at the dividing line of the parts of the latter.

7. In a worm gear reduction unit, a base housing, an upper housing enclosing the worm wheel and assembled on top of said base housing, a separate mounting member carrying the worm and its shaft, a slideway parallel to the worm shaft and located at the bottom of said upper housing, said mounting member engaging in said slideway, and means for adjustably holding said mounting member at a predetermined position in said slideway.

8. In a worm gear reduction unit, a base housing, an upper housing enclosing the worm wheel and assembled on top of said base housing, a separate mounting member carrying the worm and its shaft, a slideway parallel to the worm shaft and located at the bottom of said upper housing, said mounting member engaging in said slideway, and adjustable connecting means between said mounting member and said base housing for holding said mounting member at a predetermined position in said slideway.

9. In a worm gear reduction unit, a base housing, an upper housing enclosing the worm wheel and assembled on top of said base housing, an inner housing carrying the worm and its shaft and adapted to contain lubricant, and a slideway parallel to the worm shaft and supporting said inner housing in dependent position on the bottom of said upper housing.

10. In a worm gear reduction unit, a base housing, an upper housing enclosing the worm wheel and assembled on top of said base housing, an inner housing carrying the worm and its shaft and adapted to contain a lubricant, a slideway parallel to the worm shaft and supporting said inner housing in dependent position on the bottom of said upper housing, and an adjusting screw connected to said inner housing and projecting through said base housing for moving said inner housing to a predetermined position in said slideway.

11. In a worm gear reduction unit, a base housing, an upper housing enclosing the worm wheel and assembled on top of said base housing, an inner housing carrying the worm and its shaft and adapted to contain lubricant, worm shaft bearings in said inner housing located immediately adjacent the ends of the worm, slide bearing blocks carried by said inner housing and adapted to contact the peripheral sides of the worm wheel, a slideway parallel to the worm shaft and supporting said inner housing in dependent position on the bottom of said upper housing, and an adjusting screw connected to said inner housing and projecting through said base housing for moving said inner housing to a predetermined position in said slideway.

WARREN NOBLE.